Patented Sept. 1, 1931

1,821,815

UNITED STATES PATENT OFFICE

DERIC WILLIAM PARKES, OF WEST BROMWICH, ENGLAND, ASSIGNOR OF ONE-HALF TO HERBERT WILLIAM ROBINSON, OF BIRMINGHAM, ENGLAND

SEPARATION OF ORTHO-DIHYDROXYBENZENE BODIES

No Drawing. Application filed July 30, 1928, Serial No. 296,418, and in Great Britain August 5, 1927.

This invention relates to methods of obtaining bodies of the ortho-dihydroxybenzene or pyro-catechol series, and it is the particular object of the invention to extract these bodies from ammonia liquors and like liquors. The most important body of the series is pyro-catechol itself, which is at present used in the preparation of photographic developers and for many other purposes, being generally prepared synthetically. The principal object of the present invention is to obtain pyro-catechol and other catechol bodies by a new process much more cheaply and easily than has been possible hitherto, and, at the same time, to devise a process for the extraction of the catechol from liquors in which it is present in very small quantities. This invention also aims at employing a reagent for this purpose which can be recovered and used again without being subjected to complex chemical reactions. It is a further object of the present invention so to treat ammonia liquors that the tar acids or monohydric phenols contained in them may subsequently be removed more easily than has been possible hitherto, and thus to simplify the purification of the liquors before they are discharged into sewage purification plants or into rivers.

It is found that the catechol bodies occur especially in the ammonia liquors produced from the destructive distillation of coal when the volatile products of distillation are subjected only to a relatively low temperature, as is the case, for example, when vertical gas retorts are employed. The present invention aims at treating fresh virgin liquors obtained from such distillation processes, but the best treatment for any given liquor can only be prescribed by making a chemical analysis of that liquor. Thus it is found that nearly all liquors contain certain bodies which, if they are not removed before the liquors are treated according to the present invention, will themselves react with the reagent employed and thus render the process uneconomical. These bodies comprise both organic and inorganic matter, the latter being principally certain soluble sulphides and soluble carbonates, and in particular ammonium sulphide and ammonium carbonate.

According to the present invention therefore, the method of obtaining the pyro-catechol bodies consists in adding a reagent, capable of precipitating the catechol bodies, to an ammonia liquor or like liquor which has been subjected to a preliminary treatment so as to remove impurities having an adverse effect upon the reaction, such as the organic matter, sulphides and carbonates mentioned above. The precipitate thus formed is then extracted and treated to recover the catechol bodies. The preliminary treatment to which the liquor is subjected before the addition of the reagent may consist in the distillation of the liquor for the recovery of ammonia. Preferably, the distillation comprises simple boiling, since the distilled liquor is then slightly acid and accordingly the catechol is better preserved as such than if the liquor is made alkaline, as is the case when milk of lime is added.

Other methods of removing the impurities adverse to the reaction may however advantageously be employed in certain circumstances. In the case of liquors containing relatively small quantities of inorganic impurities, but considerable quantities of organic impurities, it is preferred to add a mineral acid to the liquor, when a sludge is formed containing some product of reaction of the impurities with the acid. This sludge can subsequently be removed. In addition the mineral acid decomposes any carbonates and sulphides present liberating carbon dioxide and hydrogen sulphide which are thus removed from the liquor. Suitable mineral acids are hydrochloric acid or nitric acid. Sulphuric acid should not be used if, as is preferred, the catechol is to be precipitated by means of a lead compound, since insoluble lead sulphate would be formed. The action of the mineral acid may be assisted by blowing air through the liquor, and in some cases this will reduce the amount of acid required.

It is preferred after this step of acidification to render the liquor alkaline again by the addition of ammonia or other alkaline body, since it is found that, in order to obtain the best possible amount of catechol from a given volume of liquor with the minimum amount of reagent, the solution both before and after the addition of a reagent should be alkaline. This is due to the fact that the precipitate formed upon the addition of the reagent is nearly always of such a type as to be dissolved by weak acids. Care must, however, be taken in every case to avoid making the liquor too alkaline since with the majority of the reagents which may be used, in accordance with the present invention, some of the reagent itself will be precipitated as a hydroxide in solutions that are heavily alkaline in character and thus will be wasted.

In the treatment of liquors containing free ammonia and a large quantity of inorganic impurities such as the sulphides and carbonates referred to above, it is found that the addition of sufficient acid to neutralize the ammonia and precipitate the sulphides and carbonates as a sludge renders the whole process uneconomical, and it is preferred in this case to add some substance capable of precipitating the sulphides and carbonates without the necessity of acidifying the liquor. Conveniently bleaching powder may be added to the liquor since this has been found to destroy practically all the sulphides present without the evolution of any gas. Lime may be added with the bleaching powder when this will react with the soluble carbonates to form insoluble calcium carbonate. Both the bleaching powder and lime are preferably first made into a cream with water, and then stirred into the liquor. The whole liquor should then be allowed to settle thoroughly since otherwise the catechol compounds subsequently precipitated will be contaminated with insoluble calcium compounds. This preliminary treatment of the liquor with the bleaching powder or other substance, for example a hypochlorite, serves only to remove the inorganic impurities referred to above, and is not suitable when there are large amounts of organic impurities present.

There are many substances which may be used for the precipitation of the catechol. These substances must, of course, be capable of precipitating the catechols, that is the ortho-dihydric phenols, to form an insoluble precipitate, but they must not form with the tar acids or monohydric phenols compounds which precipitate in very dilute solutions. It is preferred to use a lead compound as the reagent, and in this case a lead catechol compound is formed and is precipitated. Provided the liquor is alkaline, any one of a number of lead compounds may be employed such as, for example, lead chloride, lead acetate, lead nitrate, lead hydroxide, lead carbonate, and lead monoxide. The most convenient of these reagents is lead chloride which forms a lead catechol precipitate with the production of hydrochloric acid, the latter in the presence of ammonia being converted into ammonium chloride. By treating the lead catechol precipitate with hydrochloric acid, catechol is liberated and goes into solution while lead chloride is formed and, being sparingly soluble, can be removed as a solid and used again. It is, however, very difficult to obtain a quantitative reaction between the lead chloride and the catechol in the liquor particularly when there is any relatively large proportion of Cl ions or $SO_4$ ions present, since it has been found that the presence of either of these ions has an adverse effect upon the reaction between solid lead chloride and catechol. This is probably due to the tendency of the Cl ions to prevent the lead chloride going into solution and of the $SO_4$ ions to coat the lead choride with insoluble lead sulphate. Solid lead chloride can, however, be used efficaciously with liquors containing relatively small amounts of chloride and sulphate, but if a prior acidification treatment is employed it is preferred to add as little hydrochloric acid as possible, so as to reduce the amount of Cl ions which are inevitably introduced when hydrochloric acid is employed. The limiting values with which solid lead chloride can be used cannot be defined with any accuracy, since while the effect of the two ions is additive, that of the sulphate ion is greater than that of the chloride ion. Thus a liquor containing about 0.6% of chloride and 0.1% of sulphate could be treated satisfactorily with solid lead chloride, while one containing about .036% of chloride and 0.16% of sulphate could be treated by means of a slightly modified process.

It has been found, however, that a solution of lead chloride in sodium acetate and an acid may be employed economically for the treatment of all liquors. Other bodies which have been found to be capable of precipitating the catechol, although not as efficient as lead chloride or lead acetate, are aluminum sulphate, zinc chloride, manganous sulphate or chloride, and magnesium sulphate or chloride. It is not certain whether each of these bodies has a true reaction with the catechol or whether in certain cases hydroxides are first precipitated and these serve to absorb the catechol and to yield it up again on subsequent treatment. It is also found that certain iron salts will precipitate the catechol, but in this case certain undesirable iron catechol compounds are formed from which it is very difficult to recover the catechol. For this reason it is preferred not to employ a reagent containing iron, and furthermore care should be taken to ensure that the liquor in an acid condition does not come into contact with an iron vessel. Actually it is preferred to use a lead lined vessel.

As has been stated above, the liquor should be alkaline both before and after the addition of the reagent. It is found, in fact, that for complete practical success very close control over the acidity or alkalinity of the liquor at various stages of the process is necessary. Measured in terms of pH values, that is to say the hydrogenion concentration, where a pH value of 7 corresponds to a neutral solution, above 7 an alkaline solution and below 7 an acid solution, it may be stated that where a lead salt is used as the reagent the best yield of catechol is obtained when the solution, after treatment with the reagent and precipitation of the catechol compounds, has a pH value of 7.5 to 8.5. Thus if the liquor has been subjected to prior acidification treatment, it is necessary to restore it to an alkaline pH value before the addition of the reagent. If, however, the liquor has been subjected to a prior treatment with bleaching powder, it will not in general be necessary to add any further alkali.

The precipitate containing the catechol, which will be $C_6H_4O_2Pb$ if a lead reagent has been employed, will settle as a thick sludge, from above which clear liquor may be drawn off from time to time. It is preferred to wash this sludge and to remove the wash water by decantation, and then to dry the sludge as far as possible by filtration. This sludge may then be treated in various ways for the recovery of the catechol contained in it.

Where the catechol is combined with lead, hydrochloric acid may be employed so as to produce lead chloride which is precipitated leaving a catechol solution. An excess of hydrochloric acid should be added in order to precipitate as much lead chloride from the catechol solution as possible. The catechol solution may be distilled to dryness leaving a residue containing a little lead chloride and the catechol, which can be extracted from the residue by means of any convenient solvent such as benzol.

Again, the lead catechol compound may be decomposed with hydrogen sulphide. Alternatively the catechol may be poured off or filtered from the residue while it is still hot, and the catechol extracted by distillation at atmospheric pressure. Yet another method of extraction consists in first adding the hydrochloric acid so as to form lead chloride and then in precipitating the residual lead chloride by means of sulphuric acid or hydrogen sulphide for example, but care must be taken that no excess of acid is added. The resulting solution may then be distilled, preferably under reduced pressure, to remove the water, and at the same time the catechol itself may be distilled so that the first step in the purification of the crude catechol may be effected simultaneously with the last step in the extraction of that crude catechol. When ammonium salts are present with the catechol, they prevent economical distillation until they have been washed out. This must be done before decomposition of the lead catechol compound, as otherwise extraction with a solvent is essential. It has been found that the catechol obtained according to the present invention is over 90% pure after the first distillation process, and obviously it can be further purified by a second distillation or any suitable treatment.

In order that the invention may be more readily carried into effect, some examples of processes conducted in accordance therewith will now be described in greater detail.

In dealing with a virgin ammonia liquor received from a gas works which is found on analysis to contain about 0.1% of catechol and 1.5% of volatile ammonium salts (which are principally ammonium sulphide and ammonium carbonate) with little, if any, organic matter present, 1,000 gallons of the liquor are taken and 300 lbs. of bleaching powder and 200 lbs. of lime are stirred in, each in the form of a cream in water. The whole mixture is then allowed to settle, and a clear liquor free from carbonate and sulphide is drawn off.

70 lbs. of lead acetate dissolved in water are then added to the liquor drawn off, and the lead catechol compound formed is allowed to settle. Clear liquor is drawn off, and the remaining precipitate is washed with water and again allowed to settle. This precipitate is then dried and decomposed with 12 gallons of hydrochloric acid of 20°Tw. As a result, the catechol goes into solution and the greater part of the lead is precipitated as lead chloride which is removed. The catechol solution is next distilled to remove water, leaving a residue of catechol and lead chloride together with a certain amount of various ammonium salts. The catcheol may be extracted from this residue by means of benzol, and upon evaporation of the benzol 9.6 lbs of catechol are obtained.

Another method of treating this liquor consists in first adding 100 gallons of hydrochloric acid of 31° Tw. instead of the bleaching powder and lime. As before the liquor is allowed to settle, and the clear liquor which is drawn off is brought to a pH value of about 9 by the addition of 7.5 gallons of ammonia of specific gravity 0.880.

The reagent added to this liquor comprises a solution of 47.7 lbs. of lead chloride and 39.75 lbs. of sodium acetate in 1.375 gallons of water and 0.225 gallons of nitric acid of specific gravity 1.4. The lead chloride may conveniently be some that has been recovered from a previous operation.

The lead catechol compound formed is worked up as in the example described above, and 10 lbs. of crude catechol capable of crystallizing are recovered.

In another case, a liquor, found to contain about 0.1% of catechol and 0.8% of volatile ammonium salts, again principally ammonium sulphide and ammonium carbonate, can particularly suitably be treated by preliminary acidification owing to the relatively small amount of sulphide and carbonate present, and accordingly 60 gallons of hydrochloric acid of 28° Tw. are added to 1,000 gallons of the liquor. The clear liquor obtained after settling is then brought to a pH value of about 9 by the addition of 10 gallons of ammonia of specific gravity 0.880.

The reagent added in this case consists of a solution of 47.7 lbs. of lead chloride and 59.5 lbs. of sodium acetate in 2.395 gallons of water and 0.12 gallons of hydrochloric acid. As before the lead catechol precipitate is separated, washed and dried, and it is then decomposed with 4.5 gallons of hydrochloric acid. On treatment of the catechol solution thus produced in the manner described above, 10.6 lbs. of crude catechol are obtained.

In yet another case the liquor is first distilled for the recovery of ammonia, and it is then found on analysis to contain between 0.4 and 0.5% of catechol, more than 0.6% of tar acids or monohydric phenols, 0.068% of ammonia, 0.162% of sulphuric acid in the form of sulphate and 0.0364% of hydrochloric acid in the form of chloride. Since this liquor has been subjected to a preliminary treatment, in that it has been distilled for the recovery of ammonia, the organic impurities, sulphides and carbonates, are present in relatively small quantities. Accordingly the liquor may be treated directly with the reagent, so 300 lbs. of lead chloride suspended in 300 gallons of hot water are added to 1,000 gallons of the liquor, and the whole is thoroughly stirred. 10 gallons of ammonia of 0.88 specific gravity are then added, and the mixture is allowed to settle. The lead catechol precipicate which is obtained from the mixture is filtered so as to dry it as far as possible, and is then decomposed with 26 gallons of hydrochloric acid of specific gravity 1.14.

The solid lead chloride thus produced is separated from the aqueous catechol solution by filtration, and is washed with water. The filtrate and the washing water are next distilled so as to remove the water, and the residual crude catechol solution is separated from any remaining solid by decantation while still hot. Any remaining traces of catechol are extracted from the solid residue by means of hot benzol. The decanted catechol solution and the benzol extract are then mixed together and distilled, 49.2 lbs. of crude catechol capable of crystallization being left. Upon further distillation, this separates into three fractions yielding respectively 39.05 lbs. of distilled catechol crystallizing at 70° C., 6.45 lbs. of higher homologues of catechol, and 3.7 lbs. of pitch. The lead chloride recovered amounts to 297 lbs., i. e. 99% of the amount originally added.

However, in another case in which a liquor is distilled for the recovery of ammonia and is allowed to stand in contact with air, a quantity of organic impurity sufficient to affect adversely the subsequent reaction is found to be present. 1,000 gallons of this liquor are therefore acidified by means of 6 gallons of hydrochloric acid and the clear liquor is decanted from the sludge which forms. This liquor is then rendered alkaline again by the addition of 4 gallons of ammonia, when it is ready for the addition of a reagent to precipitate the catechol, the subsequent treatment being as described above.

The invention is particularly concerned with the method of recovering and obtaining catechol bodies from ammonia liquor, but it is found to possess several incidental advantages. When it is desired to dispose of ammonia liquor either as crude liquor or as the effluent of an ammonia still, it is necessary to remove from it a number of impurities which render it objectionable either for passing through sewage beds or for direct discharge into rivers. In particular the tar acids must be removed, and this may conveniently be done in the manner described and claimed in the specification of Patent No. 1,653,783 to Herbert William Robinson and Deric William Parkes dated 27th December, 1927. Even with such treatment, however, it is found that certain liquors, particularly those obtained from low temperature processes, still have a very high oxygen absorption figure, and are liable to develop brilliant colors. It is found that prior treatment according to the present invention for the recovery of catechols from this liquor, results in a considerable reduction in the oxygen absorption figure and also in a nearly complete removal of the objectionable color-producing bodies. Yet another advantage consists in a prolongation in the active life of the activated carbon which is used to adsorb the tar acids, since the bodies removed from the process in accordance with the present invention foul the carbon and render it rapidly unfit for use to remove the tar acids.

Having thus described my invention what I claim as new, and desire to secure by Letters Patent, is:—

1. A method of treating an ammonia liquor containing tar acids and bodies of the ortho-dihydroxybenzene series which consists in adding to the liquor a reagent comprising inorganic salts of the group consisting of lead, aluminum, zinc, magnesium and manganous salts having the property of reacting with the ortho-dihydroxybenzene bodies to precipitate them as insoluble compounds, removing the precipitate thus formed and treating the remaining liquor for the removal of tar acids.

2. A method of separating substantially the whole of the bodies of the ortho-dihydroxybenzene series from an ammonia liquor containing said bodies in very small quantities, consisting in adding a reagent, comprising inorganic salts of the group consisting of lead, aluminum, zinc, magnesium and manganous salts having the property of precipitating said bodies, to an ammonia liquor which contains said bodies and which has been subjected to a preliminary treatment for the removal of organic impurities, sulphides, and carbonates, separating the precipitate thus formed and treating said precipitate to recover said bodies.

3. A method of separating substantially the whole of the bodies of the ortho-dihydroxybenzene series from an ammonia liquor consisting in distilling for the recovery of ammonia an ammonia liquor which contains said bodies in very small quantities, adding to the spent liquor thus obtained a reagent comprising inorganic salts of the group consisting of lead, aluminum, zinc, magnesium and manganous salts having the property of precipitating said bodies, separating the precipitate thus formed and treating said precipitate to recover said bodies.

4. A method of separating substantially the whole of the bodies of the ortho-dihydroxybenzene series from an ammonia liquor containing said bodies in very small quantities, consisting in subjecting said ammonia liquor to a preliminary treatment for the removal of organic impurities, sulphides and carbonates, adding to said treated liquor a reagent comprising inorganic salts of the group consisting of lead, aluminum, zinc, magnesium and manganous salts having the property of precipitating said bodies, separating the precipitate thus formed and treating said precipitate to recover said bodies.

5. A method of separating substantially the whole of the bodies of the ortho-dihydroxybenzene series from an ammonia liquor containing said bodies in very small quantities, consisting in first adding to said ammonia liquor a substance capable of removing from said liquor organic impurities, sulphides and carbonates, then adding to said liquor a reagent comprising inorganic salts of the group consisting of lead, aluminum, zinc, magnesium and manganous salts having the property of precipitating said bodies, separating the precipitate thus formed and treating said precipitate to recover said bodies.

6. A method of separating substantially the whole of the bodies of the ortho-dihydroxybenzene series from an ammonia liquor consisting in first adding to said ammonia liquor a mineral acid, then adding to said liquor after the addition of said acid a reagent comprising inorganic salts of the group consisting of lead, aluminum, zinc, magnesium and manganous salts having the property of precipitating said bodies, separating the precipitate thus formed and treating said precipitate to recover said bodies.

7. A method of separating substantially the whole of the bodies of the ortho-dihydroxybenzene series from an ammonia liquor containing said bodies in very small quantities, consisting in first adding to said ammonia liquor a mineral acid, then rendering alkaline said acidified liquor, adding to said alkaline liquor a reagent comprising inorganic salts of the group consisting of lead, aluminum, zinc, magnesium and manganous salts having the property of precipitating said bodies, separating the precipitate thus formed and treating said precipitate to recover said bodies.

8. A method of separating substantially the whole of the bodies of the ortho-dihydroxybenzene series from an ammonia liquor containing said bodies in very small quantities, consisting in adding a lead reagent chosen from the group consisting of lead chloride, lead acetate, lead nitrate, lead hydroxide, lead carbonate and lead monoxide to an ammonia liquor which contains said bodies and which has been subjected to a preliminary treatment for the removal of organic impurities, sulphides, and carbonates, separating the precipitate thus formed and treating said precipitate to recover said bodies.

9. A method of separating substantially the whole of the bodies of the ortho-dihydroxybenzene series from an ammonia liquor containing said bodies in very small quantities, consisting in adding lead chloride to an ammonia liquor which contains said bodies and which has been subjected to a preliminary treatment for the removal of organic impurities, sulphides and carbonates, separating the precipitate thus formed and treating said precipitate to recover said bodies.

10. A method of separating substantially the whole of the bodies of the ortho-dihydroxybenzene series from an ammonia liquor containing said bodies in very small quantities, consisting in adding a reagent comprising inorganic salts of the group consisting of lead, aluminum, zinc, magnesium and manganous salts having the property of precipitating said bodies to an ammonia liquor which contains said bodies and which has been subjected to a preliminary treatment for the removal of organic impurities, sulphides, and carbonates, separating the sludge thus precipitated, filtering said sludge and treating said sludge to recover said bodies.

11. A method of separating substantially the whole of the bodies of the ortho-dihydroxybenzene series from an ammonia liquor containing said bodies in very small quantities, consisting in adding a lead reagent chosen from the group consisting of lead chloride, lead acetate, lead nitrate, lead hydroxide, lead carbonate and lead monoxide to an ammonia liquor which contains said bodies and which has been subjected to a preliminary treatment to remove the organic impurities, sulphides, and carbonates, separating the precipitate thus formed, decomposing said precipitate with hydrochloric acid and recovering said bodies from the lead chloride produced by said decomposition.

12. A method of separating substantially the whole of the bodies of the ortho-dihydroxybenzene series from an ammonia liquor containing said bodies in very small quantities, consisting in adding a lead reagent chosen from the group consisting of lead chloride, lead acetate, lead nitrate, lead hydroxide, lead carbonate and lead monoxide to an ammonia liquor which contains said bodies and which has been subjected to a preliminary treatment for the removal of organic impurities, sulphides, and carbonates, separating the lead-ortho-dihydroxybenzene compounds thus formed, adding to said compounds hydrochloric acid in excess of that required to react with said lead to form lead chloride, separating by filtration the lead chloride thus formed, and distilling the filtrate for the recovery of said bodies.

13. A method of separating substantially the whole of the bodies of the ortho-dihydroxybenzene series from an ammonia liquor containing said bodies in very small quantities, consisting in distilling said ammonia liquor for the recovery of ammonia, adding to the spent liquor thus obtained a mineral acid for the removal of any organic impurities, sulphides and carbonates, rendering alkaline said acidified liquor, adding to said alkaline liquor lead chloride to precipitate said bodies, removing the precipitate and sludge thus formed, filtering said sludge, decomposing said sludge with hydrochloric acid, removing from the solution the lead chloride thus formed and distilling said solution after the removal of said lead chloride, to recover said ortho-dihydroxybenzene bodies.

14. A method of separating substantially the whole of the bodies of the ortho-dihydroxybenzene series from an ammonia liquor containing said bodies in very small quantities, consisting in distilling said liquor for the recovery of ammonia, adding to said distilled liquor lead chloride to precipitate said bodies, removing the precipitate and sludge thus formed, filtering said sludge, decomposing said sludge with hydrochloric acid, removing from the solution the lead chloride thus formed and distilling said solution after the removal of said lead chloride, to recover said ortho-dihydroxybenzene bodies.

15. A method of separating substantially the whole of the bodies of the ortho-dihydroxybenzene series from an ammonia liquor containing said bodies in very small quantities, consisting in adding to said liquor a mineral acid for the removal of any organic impurities, sulphides and carbonates, rendering alkaline said acidified liquor, adding to said alkaline liquor lead chloride to precipitate said bodies, removing the precipitate and sludge thus formed, filtering said sludge, decomposing said sludge with hydrochloric acid, removing from the solution the lead chloride thus formed and distilling said solution after the removal of said lead chloride to recover said ortho-dihydroxybenzene bodies.

16. A method of separating substantially the whole of the bodies of the ortho-dihydroxybenzene series from an ammonia liquor containing said bodies in very small quantities, consisting in adding a solution of lead chloride to an ammonia liquor which contains said bodies and which has been subjected to a preliminary treatment for the removal of organic impurities, sulphides, and carbonates, separating the precipitate thus formed, treating said precipitate with hydrochloric acid so as to yield lead chloride and said bodies, and recovering said lead chloride and said bodies separately.

17. A method of separating substantially the whole of the bodies of the ortho-dihydroxybenzene series from an ammonia liquor containing said bodies in very small quantities, consisting in adding a soluble reagent of the group consisting of soluble lead, zinc, aluminum, magnesium and manganous compounds having the property of precipitating said bodies to an ammonia liquor which contains said bodies and which has been subjected to a preliminary treatment for the removal of organic impurities, sulphides, and carbonates, separating the precipitate thus formed and treating said precipitate to recover said bodies.

18. A method of separating substantially the whole of the bodies of the ortho-dihydroxybenzene series from an ammonia liquor containing said bodies in very small quantities, consisting in adding a soluble lead reagent capable of precipitating said bodies to an ammonia liquor which contains said bodies and which has been subjected to a preliminary treatment for the removal of organic impurities, sulphides, and carbonates, separating the precipitate thus formed and treating said precipitate to recover said bodies.

19. A method of separating substantially the whole of the bodies of the ortho-dihydroxybenzene series from an ammonia liquor containing said bodies in very small quantities, consisting in adding a reagent comprising inorganic salts of the group consisting of lead, aluminum, zinc, magnesium and manganous salts having the property of instantaneously precipitating said bodies to an ammonia liquor which contains said bodies and which has been subjected to a preliminary treatment for the removal of organic impurities, sulphides, and carbonates, separating the precipitate thus formed and treating said precipitate to recover said bodies.

In witness whereof I hereunto subscribe my name this 18th day of July, A. D. 1928.

DERIC WILLIAM PARKES.